United States Patent [19]
Hamm et al.

[11] Patent Number: 5,844,384
[45] Date of Patent: Dec. 1, 1998

[54] ELECTRONIC CHARGER-STARTER FOR VEHICLES

[75] Inventors: Valery Hamm, La Fleche; Yves Mulet-Marquis, La Meignanne, both of France

[73] Assignee: Lacme, La Garenne Colombes, France

[21] Appl. No.: 731,305

[22] Filed: Oct. 15, 1996

[30] Foreign Application Priority Data

Oct. 12, 1995 [FR] France .................................. 95 11997

[51] Int. Cl.⁶ .............................. H02J 7/00; H01M 10/46
[52] U.S. Cl. .............................. 318/140; 320/15; 320/62; 318/141; 318/145
[58] Field of Search .................................... 318/140–150, 318/138, 139; 290/4–9, 50; 322/25, 8, 28, 90; 320/15, 6, 19, 2, 39, 61, 16; 307/64, 66, 150, 149; 324/434, 627

[56] References Cited

U.S. PATENT DOCUMENTS

| | | | |
|---|---|---|---|
| 4,791,347 | 12/1988 | Britton | 320/2 |
| 4,897,591 | 1/1990 | Spani | 320/32 |
| 4,968,941 | 11/1990 | Rogers | 324/428 |
| 5,097,194 | 3/1992 | Walton et al. | 320/61 |
| 5,159,259 | 10/1992 | Hart et al. | 320/62 |
| 5,162,720 | 11/1992 | Lambert | 320/6 |
| 5,397,991 | 3/1995 | Rogers | 324/434 |
| 5,602,459 | 2/1997 | Rogers | 320/15 |
| 5,610,499 | 3/1997 | Rogers | 322/25 |

FOREIGN PATENT DOCUMENTS

| | | |
|---|---|---|
| 0 232 159 | 8/1987 | European Pat. Off. . |
| 41 23 168 | 1/1992 | Germany . |
| 1020919 | 5/1983 | U.S.S.R. . |
| 1534632 | 1/1990 | U.S.S.R. . |
| 2 026 792 | 2/1980 | United Kingdom . |

*Primary Examiner*—Paul Ip
*Attorney, Agent, or Firm*—Young & Thompson

[57] ABSTRACT

A control circuit of the current to the secondary and a control circuit of the voltage to the secondary are such that the current for charging the battery and the current for starting will each have a defined maximum value, and such that the voltage at the battery terminals will have a predetermined maximum value.

13 Claims, 2 Drawing Sheets

ELECTRONIC CHARGER-STARTER FOR VEHICLES

BACKGROUND OF THE INVENTION

The invention relates to an electronic charger-starter for vehicles.

A charger-starter for vehicles usually comprises a transformer whose primary is supplied with rectified and smoothed current under the control of a transistor operating as a chopper, and whose secondary charges a battery or supplies a starter, by means of a diode. Such a charger-starter delivers to the secondary a voltage and a current adapted to vary without their maximum value being well defined.

One advantage of the invention is to permit the use of a rectified current supply without smoothing to supply the primary of the transformer.

An object of the invention is to provide a charger-starter whose voltage at the secondary has not exceed a predetermined maximum value.

Another object of the invention is to provide a charger-starter whose current at the secondary, either when charging, or when starting, will not exceed a predetermined maximum value.

Still another object of the invention is to provide a charger-starter which, whether as a charger or as a starter, operates with maximum current intensity at the secondary, whereas a predetermined maximum voltage is not reached.

The present invention has for its object an electronic charger-starter for vehicles, using a transformer whose primary is supplied with rectified alternating current without smoothing and whose secondary, by means of a diode, charges a battery or supplies a starter, comprising:
on the one hand a control circuit for the current to the secondary,
on the other hand a control circuit for the voltage to the secondary,
such that the charging current of the battery, and the starting current, will each have a defined maximum value, and that the voltage at the terminals of the battery will have a defined maximum value.

According to other characteristics of the invention:
the operation of the starter of the charger-starter is automatically controlled by the actuation of the ignition key of the vehicle;
the primary of the transformer is supplied by means of a transistor acting as a chopper, the width of the conductive pulses of the transistor being regulated by means of a pulse width regulator.
the control circuit for the current to the secondary comprises a resistance mounted in series with said transistor, and resistances giving at a measuring point a voltage image of the current to the secondary and applied to an input of said pulse width modulator.
the control circuit of the voltage to the secondary comprises a resistance and an electro-luminescent diode whose light intensity is proportional to the voltage to the secondary.
the control circuit of the voltage to the secondary comprises moreover a photo-transistor receiving the light flux from said electro-luminescent diode, and a resistance, giving at their common point a voltage image of the voltage at the secondary and applied to another input of said pulse width modulator.
a switch is mounted in parallel on one of said resistances to ensure, upon its closing, the operation of the starter.
during charging of the battery, the charging current is at its maximum value $I_B$ whilst the voltage at the battery terminals does not reach its maximum value $V_B$.
during starting, the current of the starter is at its maximum value $I_D$ whilst the voltage at the terminals of the battery does not reach its maximum value $V_B$.

BRIEF DESCRIPTION OF THE DRAWINGS

Other characteristics will become apparent from the description which follows, given with reference to the accompanying drawings, in which.

DESCRIPTION OF THE PREFERRED EMBODIMENTS

Figure 1:
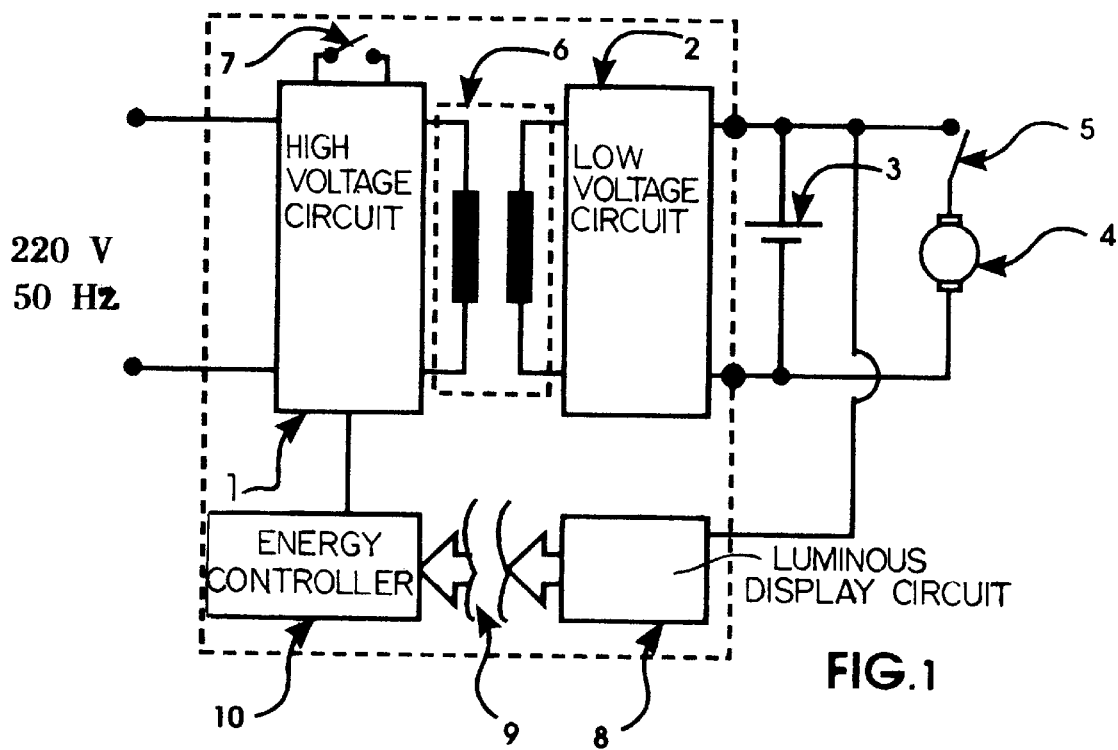
FIG. 1 is a diagram showing the principle of the charger-starter according to the invention.

In FIG. 1, the electronic charger-starter is comprised essentially of a high-voltage electronic circuit 1 of a low-voltage electronic circuit 2 and a transformer 6 which ensures the electrical isolation between the two circuits 1 and 2. The low-voltage electronic circuit 2 supplies a battery 3 of the vehicle or, by means of a switch 5 of the vehicle, a starter 4 of the vehicle. An electronic circuit 8 takes the low voltage from the terminals of the battery of the vehicle and transmits the corresponding information by means of an electrically insulated transmission 9 to an energy controller 10 which acts on the high-voltage electronic circuit 1 such that the voltage at the battery terminals does not exceed a given value.

The high-voltage electronic circuit 1 takes the energy from the alternative distribution network (220 V, 50 Hz). It transmit this energy to the low-voltage electronic circuit 2 by means of the transformer 6. The low-voltage electronic circuit 2 delivers to the battery 3 of the vehicle a charging current. The transmission of energy takes place generally at a frequency of the order of 40 KHz very much higher than that of the alternative network, which permits reducing the size and weight of the charger-starter.

The high-voltage electronic circuit 1 comprises a current limitation means drawing from the circuit, to protect the electronic circuits 1 and 2 against any damage, and to control the current delivered to the battery 3 of the vehicle or to the starter 4 of the vehicle. A switch 7 manipulable by the user, permits selecting the maximum value of the current according to the phase at hand: starting or charging the battery.

Figure 2:
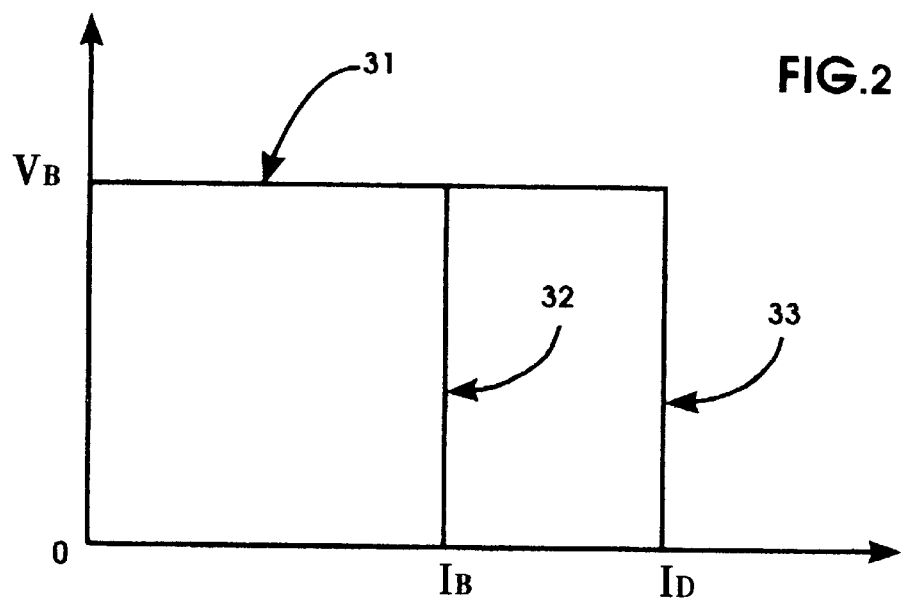
FIG. 2 shows the current-voltage characteristic of the charger-starter according to the invention.

The association of the current limiting means and of the energy controller 10 permits obtaining at the battery 3 of the vehicle and/or of the starter 4 of the vehicle, a voltage characteristic as a function of the current, shown in FIG. 2.

In FIG. 2, $I_B$ represents the charging current of the battery of the vehicle when the switch 7 is open, $I_D$ the starting current when the switch 7 is closed, and $V_B$ the maximum voltage at the terminals of the battery 3 of the vehicle.

When the voltage at the terminals of the battery is below $V_B$, the battery 3 is charged by a current $I_B$ and the point of operation rises along line 32. When the voltage reaches $V_B$, the point of operation displaces along the branch 31 and the charging current decreases to zero.

Similarly when the switch 7 is closed, the starting current takes the value $I_D$ until the voltage reaches the value $V_B$: the point of operation displaces along the branch 33, then along the branch 31.

Thus, not only as a charger but also as a starter, the charger-starter according to the invention ensures the increase of voltage to below the maximum value $I_B$ or $I_D$ respectively. Then, when the maximum value $V_B$ is reached, the current returns to zero. The charger-starter thus ensures automatically the charging the battery at the maximum predetermined voltage value, without risk of damage by overcharging.

In the starting phase, the action on the vehicle ignition key closes the contact 5 of the vehicle, placing in parallel the battery 3 of the vehicle and the starter 4 of the vehicle. The starting current takes the maximum value $I_D$ and the point of operation displaces along the branch 33. If the voltage reaches the value $V_B$, the point of operation displaces along the branch 31. At no time does the voltage exceed the value $V_B$. The battery of the vehicle or the electronics of the vehicle are no longer in danger of being damaged by too-high voltage.

It should be noted that it is the action on the ignition key of the vehicle which, controlling the opening and closing of the contact 5 of the vehicle, automatically controls the supply of starting current. It is no longer necessary, as in conventional chargers-starters, to give a manual command to the charger-starter at the suitable instance to trigger the supply of the starting current.

Figure 3:
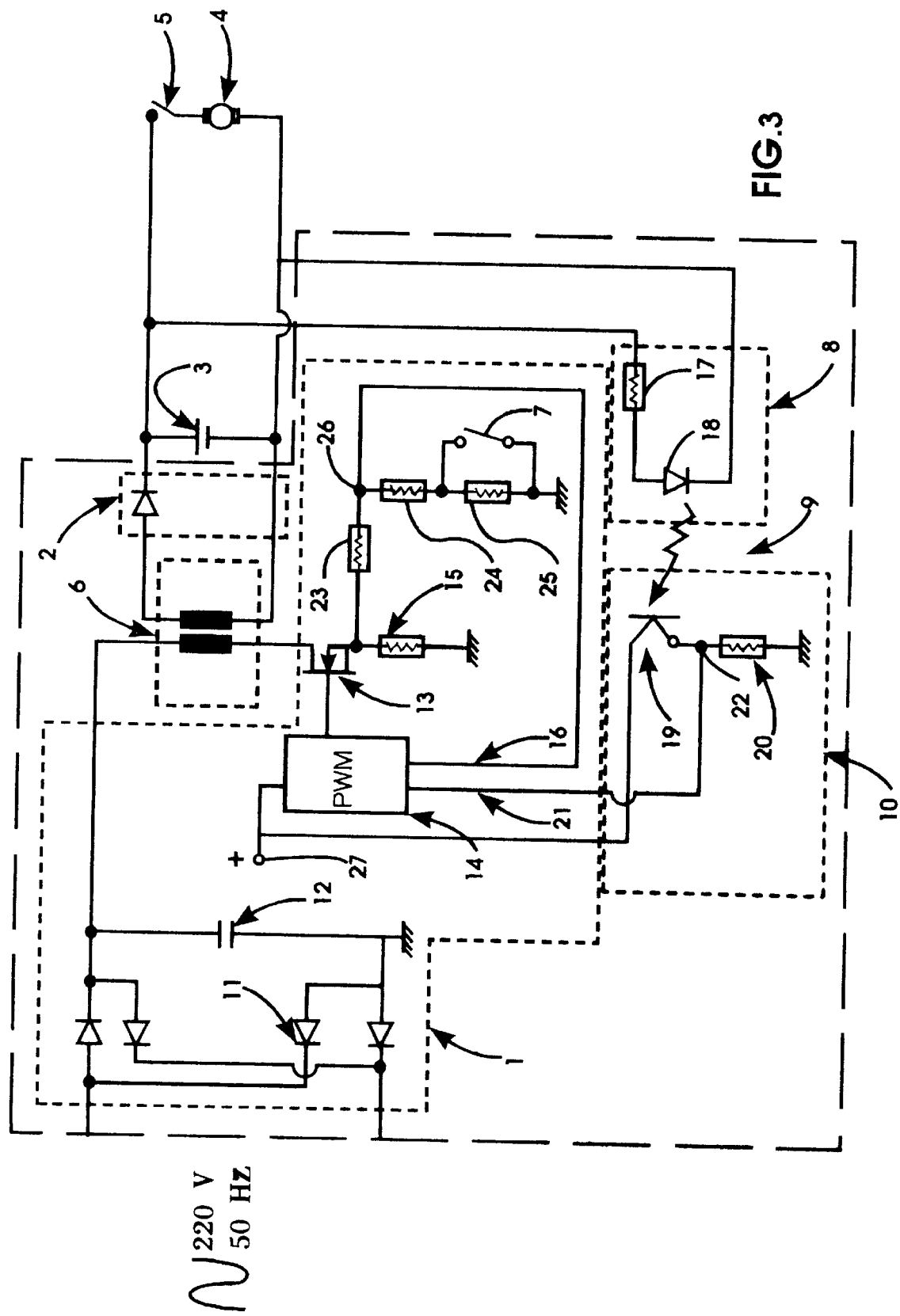
FIG. 3 shows a simplified electrical diagram of an embodiment of a charger-starter according to the invention.

In FIG. 3, the references 1 to 10 designate the same elements as in FIG. 1. The high-voltage electronic circuit 1 is comprised by a rectifying bridge 11, a low-value capacitor 12, a power transistor 13 controlled in switching mode by a pulse width modulator 14, and a set of resistances 15, 23, 24, 25. The resistance 15 is in series with the transistor 13 and the primary of the transformer 6. The resistance 23 is in parallel between the common point to the transistor 13 and to the resistance 15 and the measurement point 26. The resistances 24 and 25 are mounted between the measuring point 26 and the mass. To the terminals of the resistance 25 is connected the switch 7. The measuring point 26 is connected to the input 16 of the pulse width modulator 14.

In parallel with the battery 3 of the vehicle, the electronic circuit 8, constituted by a resistance 17 and an electro-luminescent diode 18, draws voltage from the terminals of the battery and transforms it into a luminous display: the light intensity emitted by the diode 18 is proportional to the voltage of the battery 3 of the vehicle. The electrically insulated connection 9 between the electronic circuit 8 and the energy controller 10 is a photonic connection.

The energy controller 10 is comprised by a photo-transistor 19 in series with the resistance 20. The photo-transistor 19 receives the light flux from the diode 18. The common point 22 of the photo-transistor 19 and the resistance 20 is then at a voltage proportional to that of the battery 3 of the vehicle, and this voltage is applied to another input 21 of the pulse width modulator 14.

The pulse width modulator 14 and the photo-transistor 19 are supplied with a voltage of several volts, shown at 27.

There is electrical insulation between on the one hand the primary of the transformer 6, the high-voltage electronic circuit 1 and the energy controller 10, and, on the other hand, the secondary of the transformer 6, the low-voltage electronic circuit 2, the electronic circuit 8, the battery 3 of the vehicle and the starter 4 of the vehicle.

The assembly of the electro-luminescent diode 18 and of the photo-transistor 19 can be constituted by two separate elements or by an integrated photo-coupler.

The operation of the electronic charger-starter of FIG. 3 will be explained in the following, supposing the switch 7 to be open, which corresponds to the operation of the battery charger.

The transistor 13 ensures the charging of the battery 3 of the vehicle. The resistances 15, 23, 24 and 25 supply to the measuring point 26 an image voltage of the current passing through the transistor 13. This voltage is applied to the input 16 of the pulse width modulator 14 which acts on the duration of conduction of the transistor 13 to limit to the value $I_B$ the current passing through the transistor 13. The charging of the battery 3 of the vehicle takes place then at a value $I_B$ of the current, according to the branch 32 in FIG. 2.

If, for starting, the switch 7 is closed, then the measuring point 26 delivers a voltage applied to the input 16 of the pulse width modulator 14, which acts on the duration of conductivity of the transistor 13 to limit to the value $I_D$ the current passing through the transistor 13. Starting takes place then at the value $I_D$ of current, according to the branch 33 of FIG. 2.

As soon as the voltage at the terminals of the battery 3 of the vehicle is less than the predetermined value $V_B$, it is the information as to voltage at the input 16 of the pulse width modulator 14 of which account is taken. When the voltage at the terminals of the battery reaches the predetermined value $V_B$, it is the information as to voltage at the input 21 of the pulse width modulator which is taken into account, which is to say that the branch 31 of FIG. 2 constitutes a boundary voltage limit.

What is claimed is:

1. An electronic charger-starter device for a vehicle with a battery and a starter mounted in parallel to the battery, said electronic charger-starter device comprising:

a first high voltage electronic circuit for being supplied with alternating rectified current without smoothing from an alternating current distribution network, said first circuit for operating in a charging mode and a starting mode;

a second low voltage electronic circuit comprising a diode, an output of said second circuit being connected to the terminals of the battery, said second circuit supplying, in said charging mode, a charging current to the battery, and in said starting mode, a starting current to the starter;

a transformer having a primary connected to an output of said first circuit and a secondary connected to an input to said second circuit, said transformer for ensuring electrical isolation between said first and second circuits and transmitting energy from said first circuit to said second circuit;

a voltage control circuit for controlling a voltage at said secondary, said voltage control circuit receiving an information corresponding to a voltage of the battery in order to act on said first circuit so that said voltage does not exceed a maximum value; and a current control circuit for controlling said charging current and said starting current at said secondary, comprising a current limitation means mounted in said first circuit for limiting a current supplied from the network to said first circuit so that said charging current and said starting current do not exceed respective maximum values.

2. The device according to claim 1, further comprising a switch for controlling automatic operation of said starting mode of said first circuit, in order to supply said starting current to the starter of the vehicle.

3. The device according to claim 1, wherein said first circuit comprises a power transistor connected in series to said primary, said transistor for operating as a chopper for controlling a value of a pulsed current passing through said primary, and a pulse width modulator, the output of which controls duration of conduction of said transistor in order to regulate the value of the pulsed current passing through said primary.

4. The device according to claim 3, wherein said current limitation means comprises a first resistance mounted in series with said transistor and said primary, and plural resistors connected in parallel to said first resistance, said resistors having a measuring point, which is at a voltage image of a current at said secondary, said measuring point being connected to an input of said modulator.

5. The device according to claim 3, wherein said voltage control circuit comprises a third electronic circuit having in series a resistor and an electro-luminescent diode which are mounted in parallel to the battery, said electro-luminescent diode having a light intensity which is proportional to a voltage at the secondary.

6. The device according to claim 5, wherein said voltage control circuit comprises an energy controller having a resistor and a photo-transistor in series, said photo-transistor receiving a light flux from said electro-luminescent diode, said resistor and said photo-transistor having a common point which is at a voltage image of the voltage at the secondary, said common point being connected to another input to said modulator.

7. The device according to claim 4, wherein said first circuit comprises a switch, mounted in parallel to one of said plural resistors, said switch, when opened, for supplying said charging current to the battery, and when closed, for supplying said starting current to the starter.

8. The device according to claim 1, wherein in said charging mode, said charging current is at its maximum value while the voltage at the battery rises to its maximum value, and when the battery voltage reaches its maximum value, said charging current decreases to zero.

9. The device according to claim 1, wherein in said starting mode, said starting current is at its maximum value while the voltage of the battery rises to its maximum value, and when the battery voltage reaches its maximum value, said starting current decreases to zero.

10. An electronic starter-charger for a vehicle having a battery and a starter connected in parallel with the battery, the starter-charger comprising:

a transformer with a primary for being connected to an alternating current power source and a secondary for being connected to the battery;

a battery voltage control circuit connected to said secondary for sensing a voltage at said secondary and comprising a light emitting indicator of the sensed voltage; and an input control circuit connected to said primary for controlling a voltage of said primary and comprising a photo-sensitive transistor for sensing light emitted by said light emitting indicator and a modulator connected to said photo-sensitive transistor and to said primary for adjusting the voltage of said primary so that a maximum voltage of the battery is not exceeded.

11. The starter-charger of claim 10, wherein said input control circuit further comprises, a power transistor and a first resistor connected in series to said primary, plural resistors connected between said first resistor and said power transistor, said plural resistors having a connection point therebetween that is connected to said modulator, and a switch connected in parallel to one of said plural resistors, said switch for being connected to the starter and for selecting provision of one of a charging current and a starting current by said transformer to the battery.

12. The starter-charger of claim 11, wherein said modulator is for automatically reducing said charging current and said starting current to zero when the battery is at its maximum voltage.

13. An electronic starter-charger for a vehicle having a battery and a starter connected in parallel with the battery, the starter-charger comprising:

a transformer with a primary for being connected to an alternating current power source and a secondary for being connected to the battery;

a battery voltage sensor for sensing a voltage at the secondary; and an input control circuit connected to said primary for controlling a current at said secondary, said input control circuit comprising, a pulse width modulator for receiving an indication of the sensed voltage, a power transistor and a first resistor connected in series to said primary, plural resistors connected between said first resistor and said power transistor, said plural resistors having a connection point therebetween that is connected to said modulator, and a switch connected in parallel to one of said plural resistors, said switch for being connected to the starter and for selecting provision of one of a charging current and a starting current by said transformer to the battery, wherein said pulse width modulator is for automatically setting said charging current and said starting current to zero when the battery is at its maximum voltage.

* * * * *